INVENTORS
JAMES E. HERMANSDORFER
WILLARD C. MEILANDER
BY
ATTORNEY

INVENTORS
JAMES E. HERMANSDORFER
WILLARD C. MEILANDER
BY [signature]
ATTORNEY 2,977,534

PROBLEM ANALYZER FOR PRECISION ANALOG COMPUTERS

James E. Hermansdorfer, Charlottesville, Va., and Willard C. Meilander, Atwater, Ohio, assignors to Goodyear Aircraft Corporation, Akron, Ohio, a corporation of Delaware Filed Jan. 17, 1958, Ser. No. 709,561

4 Claims. (Cl. 324—73)

This invention relates to precision electronic analog computers and to problem analyzers therefor. It is useful in quickly determining the continuity of problem board wiring and patch cord connections, accuracy, gain, and stability of the circuits and checking the effectiveness of the apparatus.

In precision electronic computers designed for general research work a multiplicity of computer elements, each comprising a device which is adapted to add, subtract, multiply, divide, or generate a time function of a constant or a variable, are mounted on a chassis together with power supplies and switching mechanism whereby they may be selectively used to solve a problem. Some of the computer elements may be standard elements while other elements may be constructed on problem boards removably mounted on the computer.

While most of the computer elements are relatively simple in circuitry and construction and could be individually tested quite easily, it is customary to connect a multiplicity of computer elements for the solution of a certain problem by means of patch cords and the matter of testing the assembly including the patch cord connections becomes complicated and time consuming.

It is the object of the present invention to provide for quickly and systematically checking an assembly of computer elements to verify the hookup or circuit arrangement, to apply tests of static and dynamic performance, to detect possible oscillation and to isolate segments of the computer circuitry for testing without removing the problem board wiring.

Another object is to provide for incorporating a problem analyzer as part of an analog computer.

Another object is to so incorporate the analyzer in the analog computer as not to reduce the accuracy of the computer.

A further object is to provide for such tests without disturbing the problem board wiring.

These and other objects will appear from the following description, reference being had to the accompanying drawings forming a part hereof.

The invention may be described as an output monitor circuit adapted to be selectively connected to one of a group of test points associated with a plurality of computer elements, a signal generator or other source of test signal adapted to be selectively connected to supply such signal to the plurality of computer elements, and switching means for so selectively connecting the computer elements for testing. The switching mechanism may include means for successively connecting a series of computer elements for successive testing in a particular order either by manual or automatic switching.

Figure 1:
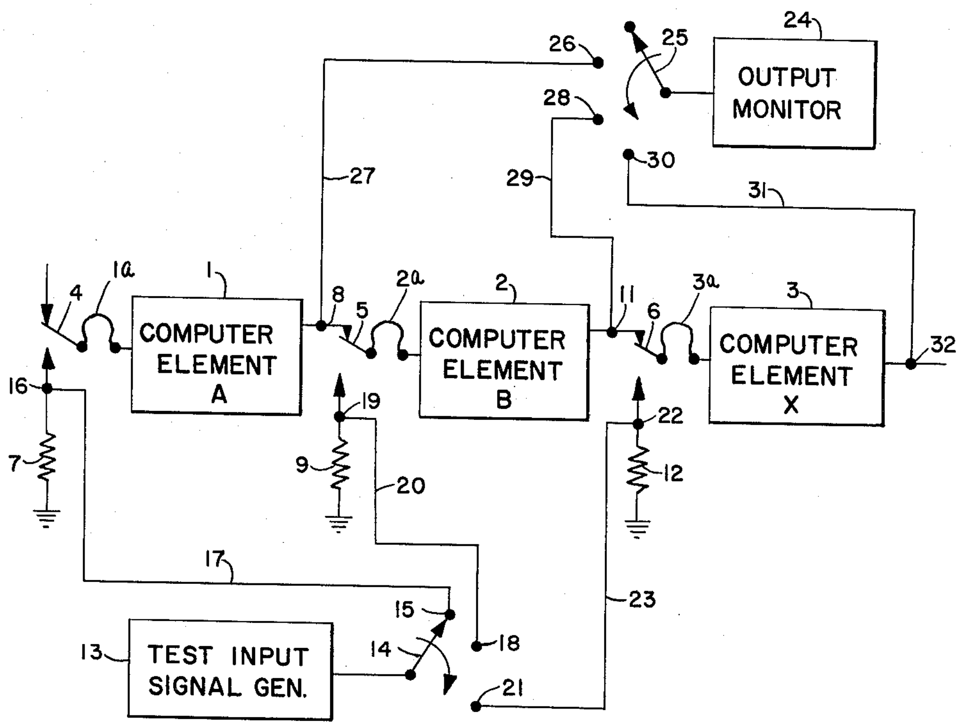
Fig. 1 is a diagram of the basic circuit of the problem analyzer of this invention.

Referring to the drawings, and first to Fig. 1 thereof, the numerals 1, 2 and 3 designate computer elements A, B and X respectively, which, as shown, may be a portion of a chain of such elements, and which may be defined as devices which are adapted to perform a mathematical operation such as to add two or more constants or variables algebraically, to multiply by a constant, to multiply by a variable, to generate the time integral of a variable or to generate the time function of a variable. Each of these computer elements is connected to a single-pole two-position input switch 4, 5, and 6, as by patch cords 1*a*, 2*a* and 3*a*. Input switch 4 (shown in the upper or operational position, i.e., connected to a preceding element—not shown) when placed into its lower or test position connects the input of computer element 1 to ground through a resistor 7. Input switch 5 in its upper position shown connects an output 8 of computer element 1 to the input of computer element 2, and in its lowered position may connect the input of computer element 2 to ground through a resistor 9. In similar manner input switch 6 in its upper position shown, connects the output 11 of computer element 2 to the input of computer element 3, and in its lowered position is adapted to connect the input of computer element 3 to ground through a resistor 12.

A test input signal supply or generator 13 is provided whereby a signal of any desired characteristic such as a direct current either continuous or interrupted or an alternating current of any desired frequency or amplitude, either modulated or unmodulated or pulsed may be supplied to the computer elements for testing them. Also a single-pole multiple-position switch 14 is provided for selectively connecting the signal supply to the computing elements for selectively testing the computer elements and their patch cord connections. For this purpose the first contact 15 of switch 14 is connected to the lower contact 16 of input switch 4 by a line 17, the second contact 18 of switch 14 is connected to the lower contact 19 of switch 5 by a line 20 and the third contact 21 of switch 14 is connected to the lower contact 22 of input switch 6 by a line 23.

For receiving and indicating the effect of a signal, an output monitor 24 which may be a voltage indicating device, a null indicator, a cathode ray display device or other indicator or recorder, is provided, and single-pole multiple-position switch 25 is provided for selectively connecting it to the computer elements. For this purpose the second contact 26 of switch 25 is connected by a line 27 with the upper contact of switch 5 and with the output 8 of computer element 1, the third contact 28 is connected by a line 29 to the upper contact of switch 6 and with the output 11 of computer element 2, and the fourth contact 30 is connected by a line 31 to an output 32 of computer element 3. The output 32 may be connected to the input switch of another subsequent computer element not shown, in a manner similar to the connection of output 11 of computer element 2 to the input switch 6 of computer element 3.

By manipulating switches 14 and 25 and switches 4, 5, and 6 any combination of the computer elements 1, 2 and 3 in series or any element by itself and its connecting patch cord may be tested without removing the elements from the other equipment.

Figure 2:
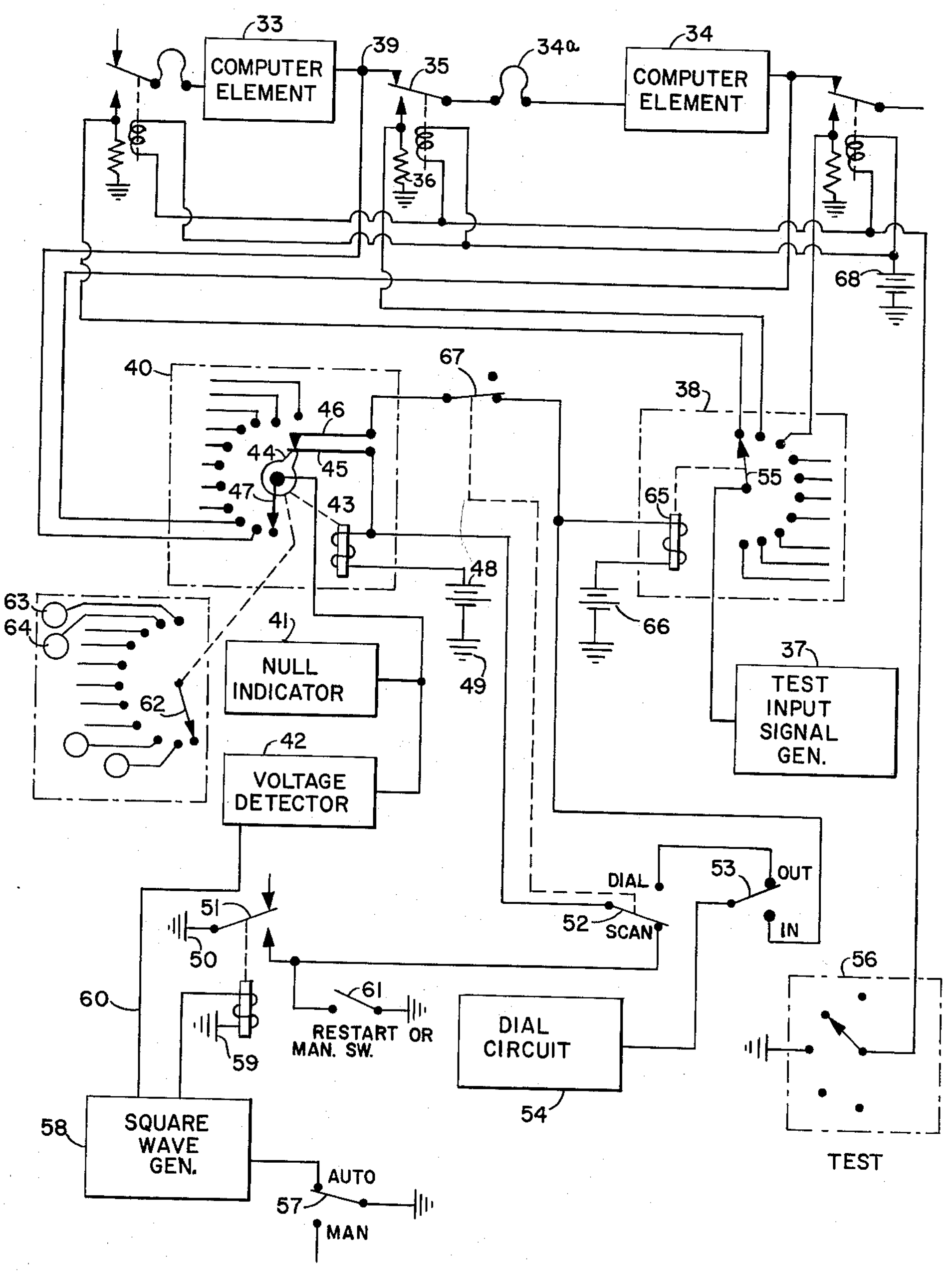
Fig. 2 is a diagrammatic view of the same with a multiplicity of computer element circuits and automatic switching mechanism.

Referring now to Fig. 2, the numerals 33 and 34 designate respectively two computer elements similar to the elements 1, 2 and 3 of Fig. 1. These elements are representative of a multiplicity of such elements connected for single or series operation or testing. A relay switch 35 in its upper or operating position connects the output of the computer element 33 through a patch cord 34*a* with the input of computer element 34 and in its lower or testing position connects the patch cord 34*a* and the input of computer element 34 with a ground through a resistor 36 and also to a test input signal from a source 37 through a stepping switch 38. The outputs of the computer elements, such as output 39 of computer element 33, are connected in the upper positions of the relay switches, such as 35, to the input of a succeeding computer element and in all positions of the switch 35 are connected through a second stepping switch 40 to an output monitor comprising a null indicator 41 and a voltage detector 42. The stepping switches 38 and 40 correspond to the switches 14 and 25 respectively of Fig. 1. However, the switches 38 and 40 may be operated either manually, by push buttons, by generating voltage impulses with a dial, or by a continuous scanning operation to analyze or test in succession a great number of computer elements and their connections.

Means is also provided for returning switches 38 and 40 to their "home" or initial position as is well known in the art.

While stepping switches and rotary switches of a variety of constructions are on the market and may be employed for this purpose, the type of stepping switch preferred has a shaft rotatable step by step throughout any number of revolutions by a pawl engaging a ratchet wheel, a solenoid 43, energizing of which attracts an armature and retracts the pawl, and a spring which advances the pawl one step when the solenoid is de-energized. The shaft also carries a cam 44 which at one position of the shaft closes a pair of contacts 45, 46 as hereinafter explained. The shaft also carries a switch arm 47 which successively makes and breaks contact with a series of contacts. The type 11 stepping switch made by C. P. Clare & Co. is, for example, suitable for this purpose. It will be understood as the description proceeds, that switches 38 and 40 may be provided with a larger number of contact positions than shown depending on the use thereof.

For operating the stepping switch 40, its solenoid 43 has one terminal connected to the positive terminal of a battery 48 or other voltage source whose other terminal is grounded at 49. The other terminal of the solenoid 43 is connected to ground at 50 through a normally open relay switch 51, a single-pole double-throw manually-operated switch 52, in scan position, or optionally may be energized through switch 52 in its opposite or "Dial" position and a single-pole manually operated double-throw switch 53 to ground through a dial circuit 54, the switch 53 being in the "Out" position shown. Energizing and de-energizing of solenoid 43 ratchets switch arm 47 step by step over a multiplicity of contacts. As the arm stops at each contact, a circuit is completed from a test input signal generator 37, an arm 55 of stepping switch 38 which is similar to switch 40, and one of the contacts of switch 38, through a computer element, if switch 56 is in "Test" position shown, the stepping switch 40 and through that switch to a null indicator 41 and a voltage detector 42.

The switch 57 may be set for automatic or manual operation indicated as "Auto" and "Man" in the drawing and the switch 52 may be set for dialing or scanning operation indicated as "Dial" and "Scan" respectively on the drawing. For opening and closing relay switch 51 with switch 57 in the automatic position (permitting operation of a square wave generator 58) and the switch 52 in the scanning position, as illustrated, the square wave generator 58, preferably of the relay type, is adapted to send a square wave current through the solenoid of relay switch 51 to a ground 59. Each voltage pulse of such current will energize relay 51 operating it to energize solenoid 43. Voltage detector 42 is provided with a voltage output line 60. The line 60 supplies a control voltage to the square wave generator and the arrangement is such that the existence of voltage at the voltage detector 42 causes a voltage at the output thereof which stops the square wave generator thereby stopping the stepping switch. In order to restart the scanning operation it is necessary to manually operate switch 61 which energizes solenoid 43 of stepping switch 40. Release of switch 61 causes stepping switch 40 to advance one step thereby releasing the voltage existing at the output of voltage detector 42 and allowing the square wave generator 58 to start operating.

The existence of voltage at the output of the computer element indicates that the circuit is being energized from the test signal input generator and the stopping of the stepping switch will occur at the position corresponding to the point at which an output voltage is found. It is then possible by comparing the input voltage with a voltage read on the null indicator 41 to determine the characteristics such as voltage gain, etc., of the computer element corresponding to the position found on stepping switch 40. The position of the stepping switch may be determined by a visual examination of the stop position or may be determined by small pilot lamps connected to a bank of contacts constrained to operate in parallel with contact points of stepping switch 40. The lamps are numbered to correspond with the circuits. For example, a switch arm 62 moves simultaneously with the switch arm 47 and turns on a light 63 when the switch arm 47 is at the first contact point of stepping switch 40. When switch arm 47 moves to the second contact point of the stepping switch 40, switch arm 62 turns off light 63 and turns on a light 64. As the switch arms 47 and 62 pass across each contact a light turns on to indicate the position of the arms. In Fig. 2 the arms 47 and 62 are shown at contact point 11, or the "home" position.

As the square wave generator is stopped by a voltage at line 60 scanning may be continued by closing the restart switch 61 as described above.

The stepping switch 38 is similar to stepping switch 40. Its stepping solenoid 65 has one terminal connected to a battery or other power source 66 having its opposite terminal grounded. The opposite terminal of solenoid 65 is connected to switch contact 46 of switch 40 through a switch 67, which, through mechanical linkage connection to switch 52 is utilized to energize and deenergize the circuitry action of switches 38 and 40. Contact 45 of switch 40 is connected to the negative terminal of solenoid 43. Contact 46 and the negative end of solenoid 65 are also connected to the "In" contact of manually operated single-pole double-throw switch 53 so that it could be grounded through the dial circuit 54.

Now remembering that the stepping switches may advance step by step in one direction only and through any number of revolutions and that energizing of a solenoid 43 and subsequent de-energizing causes one step advance and assuming that no voltage exists at line 60 and that switch 57 is in the "Auto" position and switch 52 in the "Scan" position, solenoid 43 will be energized but the stepping switches will not advance until solenoid 43 is de-energized after the first cycle of voltage from the square wave generator. With such first cycle switch arm 47 moves to the second contact. At each succeeding cycle of the square wave generator, arm 47 advances another step until one revolution of the stepping switch is completed. At this position, shown, switch contacts 45 and 46 are closed by cam 44, energizing solenoid 65. As solenoids 43 and 65 are simultaneously de-energized at the end of the cycle completing a revolution of arm 47, both switch arms 47 and 55 are advanced by their springs one step, contacts 45 and 46 are opened and arm 55 thereupon remains on the second contact of switch 38 until switch arm 47 of switch 40 completes another complete revolution. The test points or contacts on switch 40 are numbered from 0 to 11 and those on switch 38 are similarly numbered. When the rotating contact arm of switch 40 is on contact 11 the cam 44 is set to close contacts 45, 46 so that as switch arm 47 moves to 0, switch arm 55 moves off contact 0 to contact 1. This arrangement provides for scanning of 10 output circuits (switch 40) for each of 10 input circuits (switch 38), unless a voltage appears at line 60, the occurrence of which will stop the scanning operation and lights lit at the stopping position will indicate the numerical position of the detected circuit. It will be evident that a multiplicity of stepping switches may be provided to scan any given number of output and input circuits instead of the 10 positions shown in Figure 2 and described herein.

With switch 52 moved to the 'Dial" position and switch 53 in the "In" position, the dial circuit 54 may be employed to dial a certain connection of stepping switch 38. The dial circuit grounds solenoid 65 at each digital contact of the hand-operated dial so that dialing "3" will result in three successive connections of solenoid 65 to ground moving arm 55 to contact 3. It is apparent that for the proper operation of switches 38 and 40 when used in "dial" position, the switches must be reset to "home" position before proceeding with the dial impulses. The method of providing for this movement is well known in the art. By throwing switch 53 to the "Out" position with switch 52 in the "Dial" position, switch 40 may be similarly dial-operated.

With switch 52 thrown to the scanning position, the dial circuit 54 is completely disconnected and the apparatus is set for the scanning operation previously described, or manual operation through switch 61. However it will be understood that it is possible, if desired, to dial an input to allow the start of the scan operation from an input position other than the "home" position.

To provide for disconnecting all the computer's elements, such as 33, 34 from their operational connections to test connection simultaneously, the manually operated switch 56 is provided for simultaneously opening the relay switch 35 and all the relay switches similar to switch 35 from their upper or operational position to their lower or test positions. This is accomplished by simultaneously energizing solenoids of the switches one terminal of which is connected to a battery or other power source 68 the opposite terminal of which is grounded, and the opposite terminals of the solenoid of switch 35 and solenoids of similar switches, being grounded through closing of switch 56.

The operation of switch 56 disconnects all computer units from their load and grounds their input circuits at the same time removing all reference voltages from such computer elements and connects all the computer elements to the test circuit.

With the computer elements all conneced in test position, a computer element may be selected for test by the dial selector and a known test signal may be applied thereto, or the test signal may be applied by the scanning mechanism to scan the elements in succession. When a known test signal is applied, the scale factor or gain may be determined by measure of the output voltage. When the test signal is applied for a fixed time interval, then the time constants of the computer elements can be determined.

The circuit can detect leakage and cross talk problems. It can be used to calibrate potentiometers under load, thus eliminating the loading correction. The output monitor can be used to detect oscillations and when the output switches are operated individually, the subloop list can be performed.

Thus it will be seen that the objects of the invention have been accomplished and that an arrangement of computer elements may be tested in place without disturbing their operational arrangement and may be selectively tested or all elements may be successively scanned and tested in a minimum amount of time.

While a certain representative embodiment and details have been shown for the purpose of illustrating the invention, it will be apparent to those skilled in the art that various changes and modifications may be made therein without departing from the spirit or scope of the invention.

We claim:

1. A precision electronic analog computer comprising a plurality of computer elements and connecting elements for assembling them in any desired operational combination, means providing an input test signal, means for detecting an output voltage, switch means for disconnecting the elements from the desired operational combination and into a test arrangement without physically changing their positions or internal connections, and means for selectively connecting the disconnected elements to said test signal providing means and said output voltage detecting means, said means for selectively connecting the computer elements comprising a stepping switch including an operating solenoid, square wave generating means for alternately energizing and de-energizing said solenoid to step said switch from contact to contact and said square wave generator being controlled by voltage at said voltage detecting means to stop the stepping operation upon presence of voltage at said voltage detector means.

2. A precision electronic analog computer comprising a plurality of computer elements and connecting elements for assembling them in any desired operational combination, means providing an input test signal, means for detecting an output voltage, switch means for disconnecting the elements from the desired operational combination and into a test arrangement without physically changing their positions or internal connections, and means for selectively connecting the disconnected elements to said test signal providing means and said output voltage detecting means, said means for selectively connecting the computer elements comprising a plurality of stepping switches, each having an operating solenoid, square wave generating means for alternately energizing and de-energizing the first of said solenoids to step its switch from contact to contact, said square wave generator being controlled by voltage at said voltage detecting means to stop the stepping operation upon presence of voltage at said detector means, said first stepping switch having a pair of normally open switch circuits in the energizing circuit of the operating solenoid of a succeeding stepping switch, and a cam on said first stepping switch for closing the circuit of the solenoid of the second stepping switch when the first stepping switch reaches a home position.

3. A problem analyzer for a precision analog computer having a plurality of computer elements adapted to be operationally arranged for solving a problem, said problem analyzer comprising means for providing a test input signal, means for detecting an output voltage and providing a control voltage indicative of presence of an output voltage, switching means for isolating one or more computer elements from their operationally arranged connections and presenting them for testing purposes while maintaining their physical positions and internal connections, and scanning means for selectively connecting the isolated computer elements to said test input signal means and said output voltage detecting means, controlled by said control voltage for stopping the scanning when such control voltage is present.

4. A problem analyzer for a precision analog computer having a plurality of computer elements adapted to be operationally arranged for solving a problem, said problem analyzer comprising means for providing a test input signal, means for detecting an output voltage, switching means for isolating one or more computer elements from their operationally arranged connections and presenting them for testing purposes while maintaining their physical positions and internal connections, and scanning means for selectively connecting the isolated computer elements to said test input signal means and said output voltage detecting means, said scanning means comprising a stepping switch having stepping contacts connected successively to the outputs of computer elements, a second stepping switch having its stepping contacts successively connected to the input of the computer elements through said switching means, each stepping switch having a stepping solenoid, means for alternately energizing and de-energizing the stepping solenoid of the first stepping switch, a normally open switch mounted on said first stepping switch and adapted to be closed at one position of said first stepping switch, said normally open switch being adapted when closed to energize the stepping solenoid of said second stepping switch for one step only when said first stepping switch has completed one revolution.

References Cited in the file of this patent

UNITED STATES PATENTS

| | | |
|---|---|---|
| 2,677,804 | Foster et al. | May 4, 1954 |
| 2,756,409 | Lubkin | July 24, 1956 |
| 2,851,660 | Tobin et al. | Sept. 9, 1958 |
| 2,892,153 | O'Neill | June 23, 1959 |

FOREIGN PATENTS

| | | |
|---|---|---|
| 167,947 | Australia | July 12, 1956 |